T. DARE.
Domestic Boiler.
No. 32,964. Patented July 30, 1861.
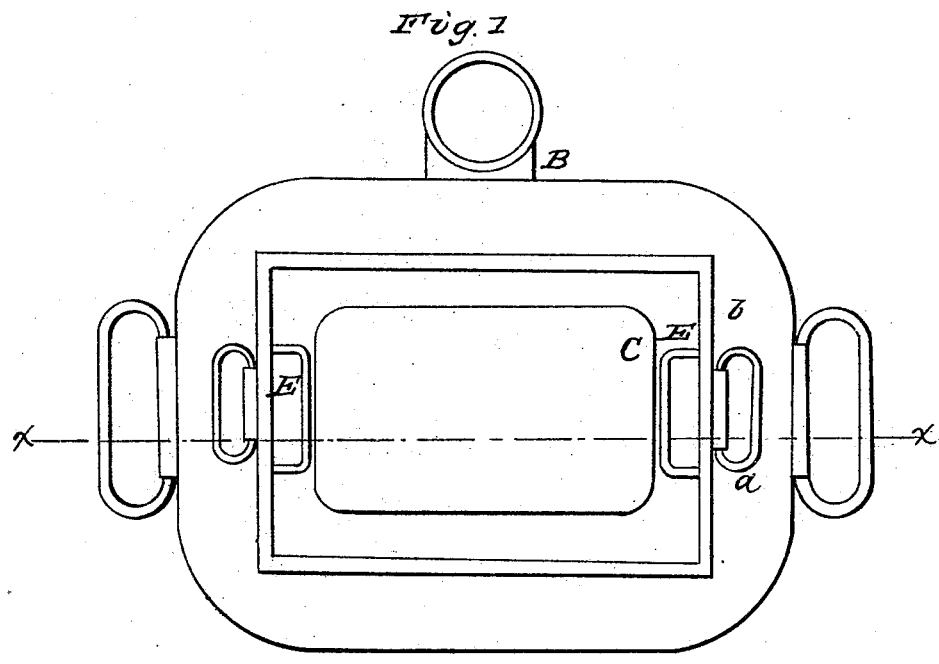
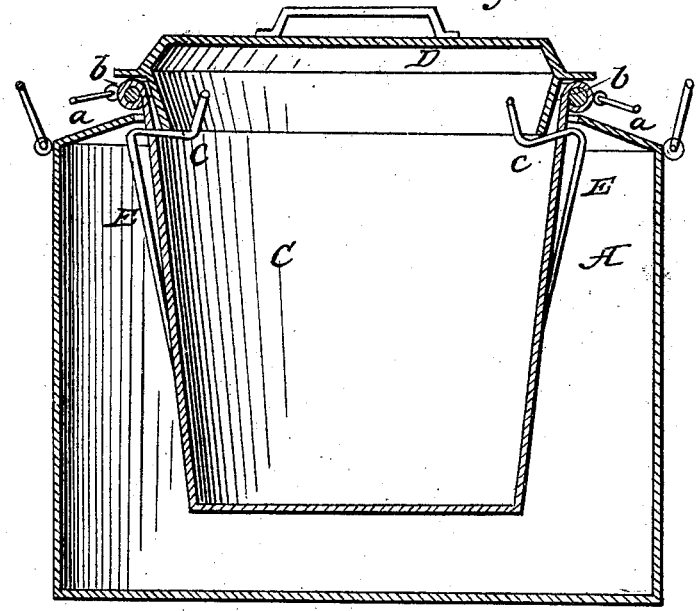

UNITED STATES PATENT OFFICE.

THOMAS DARE, OF OSCEOLA, IOWA.

CULINARY BOILER.

Specification of Letters Patent No. 32,964, dated July 30, 1861.

*To all whom it may concern:*

Be it known that I, THOMAS DARE, of Osceola, in the county of Clark and State of Iowa, have invented a new and Improved Boiler for Culinary and Similar or Analogous Purposes; and I do hereby declare that the following is a full, clear, and exact description of the same, reference being had to the annexed drawings, making a part of this specification, in which—

Figure 1 is a plan or top view of my invention. Fig. 2 is a vertical section of the same, taken in the line $x, x$, Fig. 1.

Similar letters of reference indicate corresponding parts in both figures.

This invention consists in placing one vessel within another, the inner vessel being considerably smaller than the outer one, and secured within it by springs. The outer vessel contains water, through the medium of which the contents of the inner vessel is heated without the danger of being burned, while the springs are so arranged that the inner vessel may be readily withdrawn from the outer one when necessary, the springs, at the same time, preventing the inner vessel from being raised under the action of the steam or from other causes.

To enable those skilled in the art to fully understand and construct my invention I will proceed to describe it.

A represents a vessel constructed of any proper metal and of any suitable form. This vessel is provided at one side near its top with a tube B, through which it is supplied with water, and through which the water may be discharged from the vessel by tilting the same.

The top of vessel A is provided with a flange $a$, all around its edge, and within the vessel A, a vessel C, is fitted, the vessel C, being sufficiently smaller than the vessel A, to admit of the latter holding a requisite quantity of water.

The upper part of vessel C, is provided with a flange or rim $b$, which rests on the edge of the flange $a$, of vessel A, said flange $a$, supporting vessel C. This vessel C, is provided with a cover D, and at each side of said vessel there is secured a spring E. These springs may be formed of a single piece of wire, bent in the form of loops,—see Fig. 1, and curved so as to form shoulders $c$, as shown in Fig. 2. The springs E, are attached at their lower ends to the outer side of the vessel C, as shown at $d$, and the shoulders $c$, pass through the sides of the vessel C, as shown clearly in Fig. 2.

When the vessel C, is fitted within the vessel A, the shoulders $c$, of the springs E, are just below the flange $a$, and the springs therefore retain the vessel C, within A, effectually preventing the vessel C, from being forced upward by the steam from vessel A. In order to withdraw the vessel C, from A, the upper ends of the springs E, are pressed toward each other until the shoulders $c$, will clear the edge of the flange $a$.

It is essential that the springs or fastenings E, may be so arranged that they will catch or spring into proper position as the vessel C is forced down into the vessel A, and also so arranged as to admit of being readily manipulated to allow the vessel C, to be withdrawn from vessel A. This result is fully obtained by my invention.

I do not claim broadly the fitting of one vessel within another containing water, in order to prevent the contents of the inner vessel from burning, for such device has been used, and may be seen, for instance in the common glue pot; but I do claim as new and desire to secure by Letters Patent, The inner vessel C, fitted within the vessel or boiler A, when the former is provided with springs E, E, arranged substantially as shown to serve as an efficient fastening in securing C, within A, and to admit of being readily manipulated to enable C, to be withdrawn from A, when desired.

THOMAS DARE.

Witnesses:
N. M. RIDGWAY,
S. B. CLAPP.